Patented Aug. 15, 1950

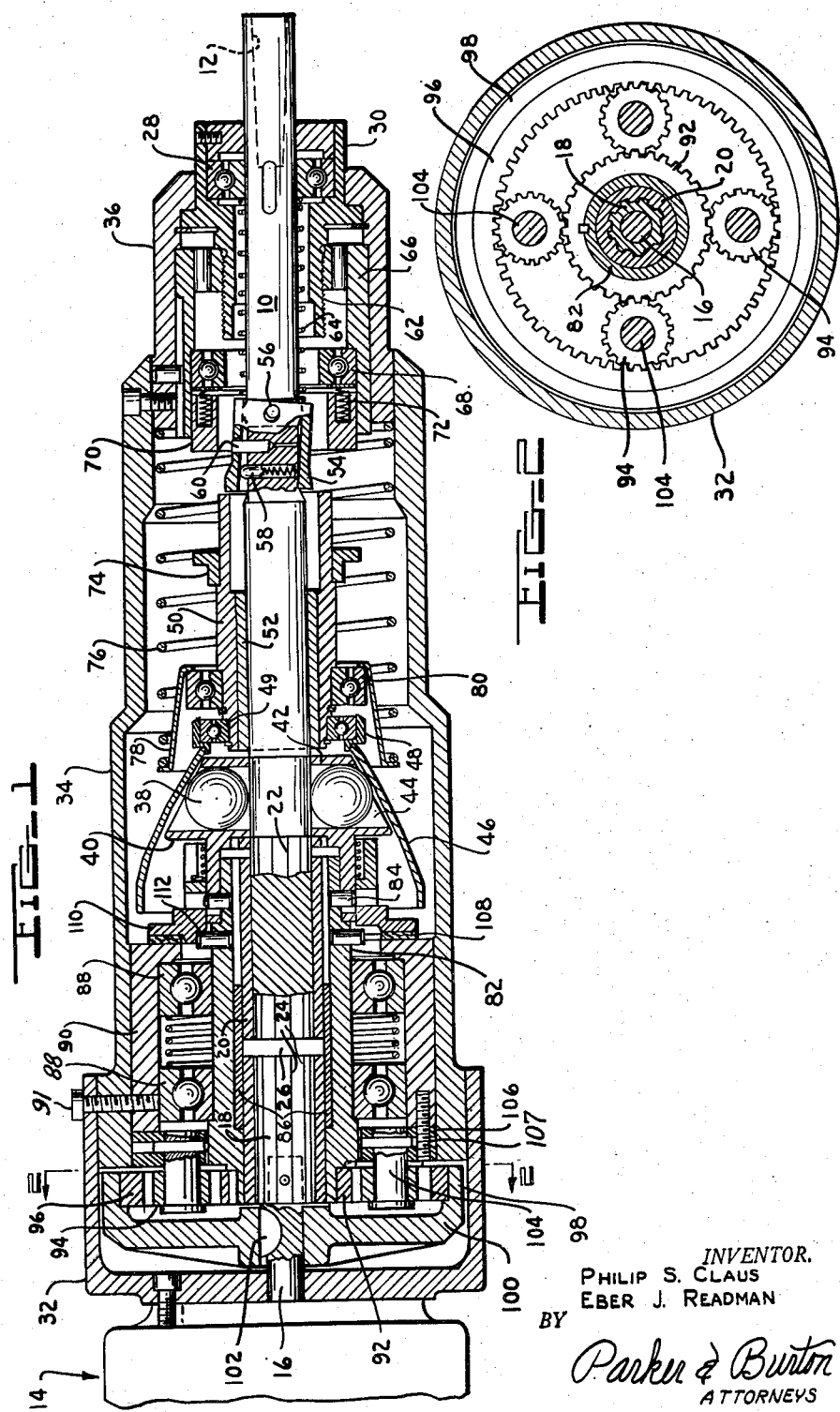

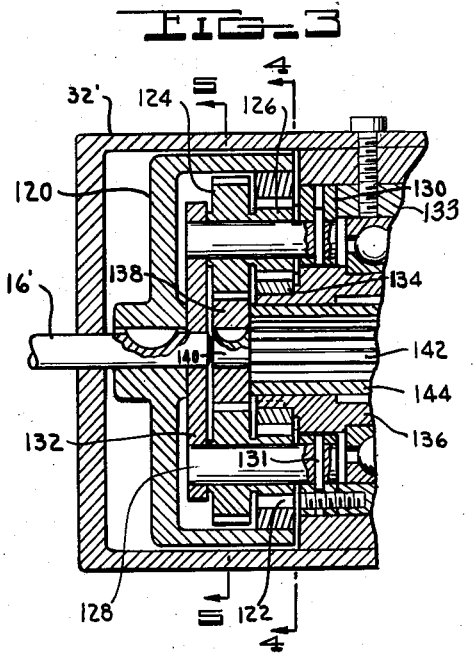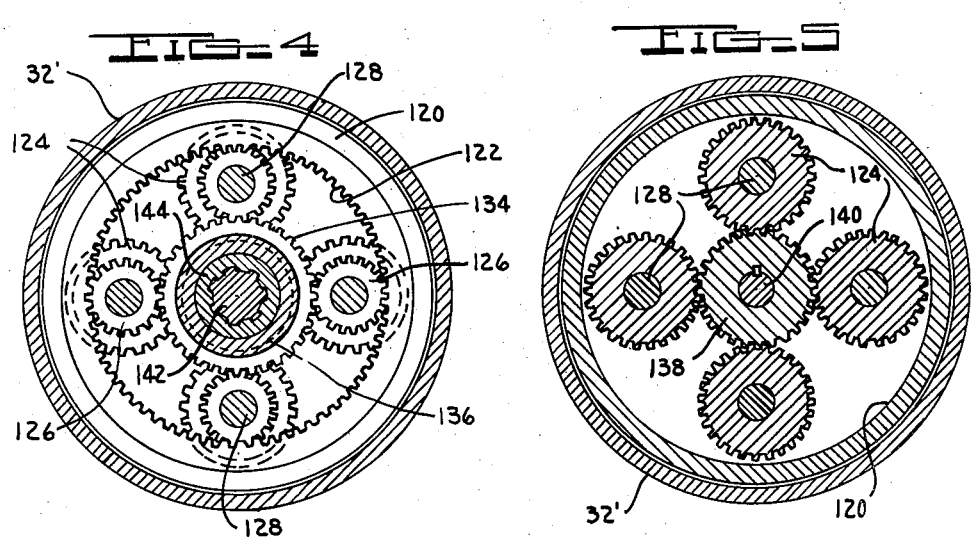

2,518,599

UNITED STATES PATENT OFFICE 2,518,599

AUTOMATIC TOOL FEEDING MECHANISM

Philip S. Claus and Eber J. Readman, Plymouth, Mich., assignors, by direct and mesne assignments, to William A. King, Highland Park, Mich., trustee Application March 8, 1947, Serial No. 733,390

8 Claims. (Cl. 77—32)

This invention relates to feeding mechanisms for tools and the like and particularly to an automatic feed head for cutting, milling, reaming or drilling operations.

Heretofore, feeding mechanisms of this character have advanced the tool toward and through the work piece upon which the operation is being performed while at the same time rotating the tool at relatively high speeds. In addition to the power means for rotating the tool supporting part of the mechanism, inertia members responsive to the rotation of the tool have been employed for moving or advancing the part and tool upon the work piece. These inertia members were usually in the form of weighted spherical elements or balls, and means was provided for converting the centrifugal force developed by the rotation of these elements to advance the part and tool upon the work piece. Such inertia members were rotated with the tool and at the same speed thereof. When additional force was desired to advance the tool upon the object being worked, the tool supporting means was rotated at a greater speed, which in many instances was detrimental to the operation being performed on the work piece. Larger and heavier inertia members could be employed but this increases the size of the mechanisms rendering them unsuitable for many types of work. Conversely, if less force was desired to advance the tool upon the object, the tool supporting means was rotated at less speed which in many instances was opposed to the desirability of employing high rotary speeds for the operation being performed.

An important object of this invention is to provide an improved feeding mechanism for tools and the like which removes the dependent relationship between the rotating tool supporting means and the inertia means heretofore existing in such devices thus enabling the tool to be rotated at the desired speed and advanced upon and through the work piece at the desired force. Another important object of the invention is to provide a novel arrangement in the feeding mechanism which enables the tool to be rotated at one speed and the inertia members employed to advance the tool at another speed thereby divorcing the mutual dependent relationship between the feed force exerted and the speed of rotation of the tool. A further object of the invention is to provide a novel combination of parts for driving the tool supporting means and the inertia members at different rates of speed which forms a compact assembly and is relatively light in weight and rugged in construction. A still further object of the invention is to provide a novel driving connection for rotating the tool supporting means and the inertia means which is adapted to drive both means at the same time and from the same source of power but at different rates of speed.

Various other objects, advantages and meritorious features of this invention will become more fully apparent from the following specification, appended claims and accompanying drawings wherein:

Fig. 1 is a longitudinal sectional view through the feed mechanism embodying the present invention, Fig. 2 is a sectional view along line 2—2 of Fig. 1, Fig. 3 is a fragmentary longitudinal sectional view of a modification of the invention, Fig. 4 is a transverse sectional view along line 4—4 of Fig. 3, and Fig. 5 is a transverse sectional view along line 5—5 of Fig. 3.

The present invention is illustrated in the drawings in two different embodiments, one of which is constructed to rotate the inertia means at a higher speed than the tool supporting means, and the other of which is constructed to rotate the inertia means at a slower rate than the tool supporting means. Figs. 1 and 2 relate to the first embodiment and Figs. 3 to 5 relate to the second embodiment.

Referring first to Figs. 1 and 2, the tool supporting means comprises a driven shaft 10 which is provided with a suitable means such as socket 12 at the outer or right end as viewed in Fig. 1 for detachably receiving a tool. The shaft 10 may be an elongated member extending substantially the length of the mechanism as shown or divided into two or more aligned shafts coupled together for joint rotation. The shaft is mounted for both rotation and axial movement. The shaft is rotated from a source of power, such as the electric motor generally indicated at 14, the housing of which may be secured directly to the housing enclosing the mechanism as shown. The armature of the motor carries a projecting driving shaft 16, having detachably secured thereto a driving member 18 which projects forwardly in alignment with the drive shaft. The inner end of the driven shaft 10 is operatively coupled to the drive shaft 16 for rotation thereby. Preferably this is accomplished by the coupling sleeve 20, the forward end section of which is splined to the rear end of the driven shaft and the rear end section of which is splined to the drive member 18. The splines of the driven shaft 10 and the drive member 18 are respectively indicated at 22 and 24 and as shown herein extend parallel to the axes of these members. A pin 26 extends transversely across the sleeve 20 separating the drive member 18 from the inner end of the driven shaft 10. The forward end of the driven shaft 10 is rotatably journaled in a bearing 28 which is carried in an adjustable mounting indicated at 30. The remote inner end of the driven shaft is supported by the coupling sleeve 20 which in turn is rotatably supported in the mechanism in a manner to be hereinafter described.

The operating parts of the mechanism are preferably housed in an elongated tubular structure gradually reducing in diameter toward the working end. As shown, this housing comprises a relatively large diameter tubular section 32 to which the motor housing is directly attached. Detachably received within and secured to the forward end of the section 32 is a second tubular section 34 which extends for the major portion of the length of the mechanism and may be jogged intermediate its ends to provide a forward part of reduced diameter. A third tubular section 36 is detachably slidably received in the forward end of the section 34. This last section is shaped to receive and hold the journaled mounting 30 previously described.

For axially advancing the driven shaft or spindle 10 and thereby carry the tool toward and through the object upon which the work is performed, there is provided inertia means in the form of a plurality of weighted members or balls 38 arranged circularly around an intermediate portion of the driven shaft. These balls are mounted in a rotatable ball cage structure comprising a rear annular plate 40, a front annular plate 42 and radial fins 44 extending between the two plates and connecting the same together to form a plurality of ball retaining pockets. Preferably, the ball cage structure is formed out of one member and as a result the annular plates and fins are integrally joined together. The pockets open outwardly radially in order to allow the balls 38 to rise thereabove.

In order to convert the centrifugal force of rotation of the balls to a linear force for axially advancing the driven shaft to and through a work piece, a conical shaped member 46, termed a pressure or pusher plate, is arranged to overlie the openings of the ball retaining pockets as shown in Fig. 1. The pusher plate converges forwardly and is secured to a collar 48 which is independently rotatably mounted by means of a ball bearing 49 on a feed sleeve 50 surrounding the shaft 10. The feed sleeve 50 is independently rotatable about the shaft 10 by the provision of a bearing therebetween of bronze or other suitable material for this purpose indicated at 52. Disconnectible means is provided for operatively connecting the sleeve 50 to the shaft 10 for advancing the same, which means is effective at a predetermined point in the advancement of the shaft to break off the connection and restrict further advance of the shaft. In the embodiment of the invention illustrated herein this means comprises a collet 54 surrounding the shaft 10 and having its forward end pivotally connected to the shaft by a pin 56. The rear end of the collet is normally tilted eccentrically to the shaft so that its rear edge is disposed in the path of travel of the forward edge of the sleeve 50 in the manner shown in Fig. 1. A spring pressed plunger 58 is utilized to tilt the collet. The collet is rockable about the pin 56 and slightly rotatable and axially shiftable relative to the shaft because of the oversize holes provided in the opposite sides of the collet through which the pin projects. The axial play of the collet is desirable in order to allow for self adjustment when the collet is rocked out of the path of travel of the sleeve 50 but its rotatable play is undesirable and is preferably prevented by the provision of a second pin 60 which slidably fits a hole in the collet and projects therethrough.

The bearing mounting 30 is provided with an inwardly projecting externally threaded tubular portion 62, the inner diameter of which is greater than the shaft 10 in order to provide clearance therebetween. A coiled spring 64 encircles the shaft in this clearance and is seated at one end on the inner race of the bearing 28 and at the other end on the collet 54. Adjustably threaded on the tubular portion 62 is a sleeve 66 which projects inwardly approximately the length of the housing section 36 and is internally shouldered to provide a seat for the outer race of the roller bearing assembly 68. A ring-shaped stop member 70 is slidably fitted into the inner end of sleeve 66 and is axially urged inwardly by springs 72. Carried on the sleeve 50 is a radial abutment in the form of a collar 74 which is adapted to engage the stop member 70 and limit further axial advance of the feed sleeve 50. The springs 72 serve to cushion the shock of engagement between the sleeve 50 and the stop member 70. The collet 54 and the tubular portion 62 are cooperatingly shaped so that as the shaft and tool approach the end of the operating stroke the inner walls of the tubular portion rock the collet on the shaft to bring the rear end thereof into substantial concentricity with the shaft and out of the path of the feed sleeve 50. When this occurs, the longitudinal drive connection between the feed sleeve and the shaft 10 is broken and the coiled spring 64 is free to return the shaft to its normal inoperative position for the next operating stroke.

A large coiled spring 76 is provided in the housing for returning the push member 46 and the feed sleeve 50 and associated parts to the initial starting position. One end of this spring is seated on the inner end of the housing section 36 and the other end is seated on the outer rim of a slightly conical sleeve 78. The reduced end of this sleeve is shaped to bear upon the outer race of a ball bearing assembly 80 interposed between a shoulder on the feed sleeve 50 and the collar 48. The bearing assembly allows the spring 76 and its seating member 78 to be stationary while these elements advance with the rotating feed sleeve.

An important feature of the invention resides in the means for rotating the inertia members 38 from the same source of power as the driven shaft 10 but at a different rate of speed therefrom. Preferably this is accomplished by the provision of a set of gears of the character illustrated in Fig. 2. The ball retaining structure 40—44 is fixed to the forward end of a sleeve 82 by any suitable means such as the pins 84. Sleeve 82 coaxially encircles the coupling sleeve 20 but is independently rotatable thereabout. This is accomplished by providing sleeve 82 with an internal diameter greater than the outer diameter of the coupling sleeve and interposing a bearing 86 of bronze or other suitable material for this purpose therebetween. Both sleeves are rotatably supported in the housing by two encircling ball bearing assemblies 88—88, the outer ball races of which are enclosed by a surrounding circular member 90 which slidably fits the rear end of the housing section 34 and is immovably secured thereto by a plurality of circularly spaced apart bolts 94.

In the embodiment illustrated in Figs. 1 and 2, the outer sleeve 82 is rotatably driven by the set of gears at a faster rate of speed than the shaft or spindle 10. Fixed on the end of the sleeve 82 adjacent to the motor 14 is an annular gear member 92 forming the driven pinion of the gear assembly. Meshing with this member are a plurality of equally circumferentially spaced apart pinions 94, four being shown in the present embodiment of the invention. These pinions in turn mesh with an internal gear 96 fixed to the underside of an overlapping circular flange 98 provided on a member 100, which is offset to the plane of the pinions. Member 100 is jointly rotatable with the drive member or shaft 16 such as by the provision of the key 102. The pinions 94 are rotatably journaled on stub shafts 104 which extend parallel to the axis of the drive and driven members in the mechanism and are mounted in an annular plate 106 abutting the rear end of the member 90. Circularly spaced apart bolts 107 secure the plate 106 to the member 90 and hold the plate and stub shafts from rotation. It is evident that rotation of the member 100 will operate through the gearing assembly to rotate the sleeve 86 at a faster rate of speed. Since the member 100 is jointly rotatable with the drive member 16 and the spindle 10, the inertia members or balls 38 will rotate at a faster rate than the spindle.

To the extent of the description of the mechanism thus far described, it is evident that upon energization of the motor both the driven shaft 10 and the balls will be rotated therefrom but at diffferent rates of speed. The balls are not dependent upon the shaft speed for rotation but are independently rotated at a faster rate. As they move out of the pockets in the ball cage structure the balls will urge the conical pusher member 46 axially forward at a force greater than if they were rotated at the same speed as the shaft and will advance the spindle and the tool through the work piece with considerably more force. By this provision the same size or even lighter weight balls may be employed to drive the spindle forward with a greater thrust force than heretofore obtainable by mechanism of this character.

At the end of the forward stroke of the feed sleeve 50 manual or automatic means may be provided for de-energizing the motor in order to allow the parts to return to their initial operating position. Since the balls are rotating at a highly rapid rate by virtue of the speed increasing drive from the source of power, it is desirable to bring the rotating balls quickly to a halt following de-energization of the motor in order to prepare the mechanism for the next power stroke and yet accomplish this without imposing undue strain or load on the motor. This is preferably accomplished by providing a frictional brake between a stationary part of the mechanism and the forward feed devices and in the illustrated embodiment of the invention such a brake is shown at 108 consisting of friction material secured to the inner end of the circular body 90. A ring 110 is mounted on the outer sleeve 82 and coupled thereto for joint rotation by one or more pins 112. The location of the ring member is such that in the initial starting position of the parts it engages the friction material as shown in Fig. 1. Following a power stroke, the parts return to their initial starting position at which time the ring member, which is rotating at the same speed as the balls, engages the friction material and is brought to a halt.

As previously mentioned Figs. 3, 4 and 5 illustrate mechanism for rotating the inertia members at a slower rate of speed than the tool. As in the previously described embodiment of the invention this is preferably accomplished by providing a reduction gear system. Referring to Fig. 3 the drive shaft from the source of power is indicated at 16' and corresponds in function to the drive shaft 16 previously described. It extends axially into a housing section 32' similar to the tubular section 32 previously described. Fixed to the drive shaft for joint rotation therewith is a ring gear or internal gear case 120 having internal teeth 122 as shown in Fig. 4. Mounted within the ring gear are two sets of gears of different sizes. The gears of the larger set are indicated at 124; the gears of the smaller set are indicated at 126.

As shown the gears of each set correspond in number and position to one another. Each gear of the larger set is paired with a gear of the smaller set, such as by being integrally connected to one as shown in Fig. 3, and both are rotatably mounted upon a common shaft 128 for joint rotation. The shafts 128 are offset to the axis of the drive shaft but extend parallel thereto. The forward end of each shaft 128 is fixed to an annular plate 130 such as by a locking pin 131. The annular plate is secured as in the previously described embodiment of the invention by bolts to a circular member 133 corresponding to member 90 previously described. The rear ends of the shafts 128 are fixed in a plate member 132 which is axially bored so as to be rotatably received over the inner end of the drive shaft 16'. The smaller set of gears 126 mesh with an annular gear member 134 fixed to an outer sleeve 136 corresponding in function to the sleeve 82 which is operatively coupled to the inertia members or balls 38 for rotating the same. The large set of gears 124 mesh with a gear wheel 138 fixed by a key or otherwise to the reduced end 140 of an externally splined driving member 142 which is coupled by means of the splines to an inner coupling sleeve 144 corresponding in function to the sleeve 20 which drives the spindle shaft 10. It will be understood that rotation of the internal gear case 120 by the drive shaft 16' will impart rotation to the two sets of gears and by reason of their unequal sizes cause the spindle driving sleeve 144 to rotate at a faster rate of speed than the sleeve 136 which drives the inertia members.

What we claim is:

1. A feeding mechanism for tools and the like including, in combination, a rotatable shaft, tool holding means rotatable with said shaft; a rotatable weight adapted to feed said shaft axially by the centrifugal force of rotation of said weight, a rotatable driving member co-axially related to said shaft, a sleeve operatively coupling said driving member with said shaft to rotate the latter, a sleeve surrounding the first mentioned coupling sleeve and shaft operatively coupling said driving member with said weight to rotate the latter at the same time said shaft is rotated, said last coupling means including gearing means for rotating the weight at a speed of rotation differing from that of the shaft.

2. A tool feeding mechanism comprising, in combination, a rotatable and axially movable shaft adapted to be operatively coupled to a source of power for rotation thereby and provided with means on one end for detachably receiving a tool, a plurality of weights encircling said shaft, rotatable means operatively connecting said weights with said shaft and operable to convert the centrifugal force exerted upon rotation of the weights to a linear force for axially advancing said shaft toward a work piece, said last means comprising two telescoping sleeves each capable of rotating freely relatively to the other, and means for rotating said weights from said source of power, said last means including gearing connected with one of said sleeves and the power source for rotating said weights at a rate of speed differing from said shaft.

3. A tool feeding mechanism comprising, in combination, a rotatable and axially movable shaft including tool holding means at one end of the shaft rotatable and axially movable therewith, a plurality of weighted members mounted in encircling relation to said shaft for revolution thereabout at a speed differing from the rate of rotation of the shaft, means operable to convert the centrifugal force exerted when the members are revolved about the shaft to a linear force for axially advancing the shaft in one direction, a rotatable driving member disposed in alignment with the end of said shaft opposite to said tool holding means, means coupling said shaft to said driving member to receive rotating impulses therefrom but permitting the shaft to advance axially relative thereto, a sleeve encircling the shaft and coupling means and independently rotatable thereabout, means coupling said sleeve to said weighted members for revolving the same, and reduction gearing coupling said sleeve to said driving member and adapted to rotate the sleeve at a different rate of speed than the shaft to thereby revolve the weighted members at a rate of speed differing from that of the shaft.

4. A tool feeding mechanism comprising, in combination, a rotatable and axially movable shaft including tool holding means at one end of the shaft rotatable and axially movable therewith, a plurality of weighted members mounted in encircling relation to said shaft for rotation thereabout at a speed differing from that of the shaft, means operable upon rotation of said members about said shaft to convert the centrifugal force exerted to a linear force for axially moving the shaft in the direction of said tool holding means, a rotatable driving member disposed in alignment with the end of the said shaft opposite to said tool holding means, a coupling sleeve operatively connected to said driving member and to the adjacent end of the shaft and adapted to transmit rotative impulses from the former to the latter while permitting axial movement of the shaft relative to the driving member, a second sleeve concentrically mounted with respect to the first sleeve and enclosing the same therewithin, means journaling said second sleeve for rotation and operatively coupling the second sleeve to said weighted members to rotate the same, and gear means operatively coupling said driving member to said second sleeve and adapted to rotate the same and the weighted members at a faster rate of speed than said shaft.

5. A tool feeding mechanism comprising, in combination, a rotatable and axially movable shaft including tool holding means at one end thereof, a driving member disposed in axial alignment with the end of the shaft opposite to said tool holding means and adapted to be rotated from a source of power, sleeve means coupling the driving member to the shaft to rotate the same, a plurality of weighted balls surrounding the shaft and rotatable thereabout and radially movable relative thereto, gearing means coupling the balls to said driving member and operable to rotate the balls about the shaft at a rate of speed differing from that of the shaft, said gearing means including a sleeve telescoping with the first coupling sleeve, a feed sleeve coaxially surrounding said shaft but both rotatably and axially movable relative thereto, means for disconnectibly coupling the feed sleeve to the shaft for joint axial movement in the direction of said tool holding means, a push member connected to said feed sleeve for joint axial movement therewith but rotatable relative thereto, said push member being engageable by said balls when the latter move outwardly radially of the shaft and operable to convert the centrifugal force resulting from the rotation of the balls to a linear force for axially moving the feed sleeve in the direction of said tool holding means.

6. A feeding mechanism for tools and the like including, in combination, rotatable tool holding means, push means for advancing said tool holding means longitudinally as it rotates by centrifugal force of rotation comprising a centrifugally operating rotatable weight and a rotatable feed member responsive to the centrifugal force of the rotating weight to advance said tool holding means, sleeve means rotatable within the sleeve for rotating said tool holding means, a common bearing for journaling the sleeve and the means rotating within the sleeve and gearing means connecting the weight with a common driving means for the tool rotating means for rotating said weight at a speed differing from that of said tool holding means.

7. A feeding mechanism for tools and the like comprising, in combination, a rotatable tool holding means, a device in the mechanism for axially feeding said tool holding means as it rotates having a centrifugally operating rotating weight co-axially related to the tool holding means and having a rotatable feed sleeve co-axially related to the tool holding means and responsive to the centrifugal force of the weight for axially moving the same, a source of power, means for rotating said tool holding means from said source of power, and gearing means connecting the power source with the weight rotating means for rotating said weight from said source of power at a speed different from that of said tool holding means.

8. A tool feeding mechanism including, in combination, a rotatable and axially moving shaft, means for detachably connecting a tool at one end of the shaft, a push member mounted on said shaft, a plurality of weighted members surrounding said shaft and adapted when rotated to exert a centrifugal force upon said push member and shift same and the shaft axially in one direction, a cage surrounding said shaft and engaging the weighted members to impart rotation thereto, a drive member disposed in alignment with the end of the shaft opposite to the tool connecting means thereof and adapted to be rotated from a source of power, reduction gearing operatively associated with said drive member, a pair of independently rotatable interfitting sleeves coaxially related to said shaft and said drive member, one of said sleeves coupling said drive member to said shaft to rotate the latter at the same speed as the drive member while permitting axial movement of the shaft relative to the drive member, and the other of said sleeves coupling said reduction gearing with said plate to rotate the weighted balls at a different rate of speed than that of said shaft.

PHILIP S. CLAUS.
EBER J. READMAN.

REFERENCES CITED

The following references are of record in the file of this patent:

UNITED STATES PATENTS

| Number | Name | Date |
| --- | --- | --- |
| 729,625 | Mathieu | June 2, 1903 |
| 1,654,963 | Crawford | Jan. 3, 1928 |
| 1,879,142 | Egan | Sept. 27, 1932 |
| 1,909,191 | Stafford | May 16, 1933 |
| 2,421,541 | Claus et al. | June 3, 1947 |